United States Patent [19]
Valladares

[11] Patent Number: 5,931,045
[45] Date of Patent: Aug. 3, 1999

[54] MECHANICAL MOTOR AND SPEED REGULATOR WITH DISCONNECTABLE ESCAPEMENT WHEEL

[75] Inventor: Angel Nuñz Valladares, Madrid, Spain

[73] Assignee: Construcciones Aeronautics, S.A., Madrid, Spain

[21] Appl. No.: 08/821,618

[22] Filed: Mar. 20, 1997

[30] Foreign Application Priority Data

Mar. 21, 1996 [ES] Spain ................................. 9600684

[51] Int. Cl.⁶ ................................................. F16H 27/00
[52] U.S. Cl. ................................................. 74/1.5; 185/38
[58] Field of Search ................................. 74/1.5; 185/38, 185/5; 368/127, 139, 140, 203, 149, 144, 151, 193, 192, 191

[56] References Cited

U.S. PATENT DOCUMENTS 5,163,535  11/1992  Jolie ........................................... 185/38

FOREIGN PATENT DOCUMENTS 0296936  12/1988  European Pat. Off. .
0309650  4/1989   European Pat. Off. .
0330550  8/1989   European Pat. Off. .
0354837  2/1990   European Pat. Off. .

*Primary Examiner*—Charles A. Marmor
*Assistant Examiner*—Ankur Parekh
*Attorney, Agent, or Firm*—Thorp Reed & Armstrong, LLP; Dennis M. Carleton

[57] ABSTRACT

Speed regulator mechanism and mechanical motor for applications in thermal vacuum on satellites. It comprises an escapement wheel (1) and a detent (5), the escapement wheel (1) being actuated by a spring, if the mechanism acts as a motor, or by the same device whose speed it controls, if the mechanism acts as a regulator, and with which is coupled the shaft (2) for connection to the structure to be deployed, either directly or indirectly through a step-up gear wheel train (3, 4), and the detent (5) carrying a flywheel (7) connected to its shaft (6). The mechanism is suitable for deploying structures such as antennas, panels or any specimen liable to be deployed on satellites placed in orbit or located in any environment.

1 Claim, 2 Drawing Sheets

5,931,045

MECHANICAL MOTOR AND SPEED REGULATOR WITH DISCONNECTABLE ESCAPEMENT WHEEL

FIELD OF THE INVENTION

The present invention relates to a speed regulator mechanism and mechanical motor for applications in thermal vacuum on satellites. Specifically, this mechanism is applicable to the deploying of structures or to experiments on a satellite be it orbiting or located in any environment, but is directed mainly at applications in thermal vacuum.

The basic aim of the mechanism of the invention is to allow the deploying of structures mounted on satellites to take place in a progressive manner at a predetermined constant speed such that these structures are not subjected to the injurious effect of high tensions.

The mechanism of the invention can act as a motor element for the direct driving of the structure or specimen borne by the satellite, to which end the said mechanism incorporates a spring which fulfils the torque requirements necessary for the deployment. Alternatively, the mechanism of the invention can act as a speed regulator which allows the deployment of the specimen at a predetermined speed, thereby avoiding undesirable accelerations and final speeds of opening and which, on the contrary, enables the required torque to be applied in full so as to overcome inertias and frictions plus safety margins, without an increase in the speed of the specimen and avoiding high shock loads thereon.

PRIOR ART

The prior art has already been engaged in designing mechanisms suitable for folding up and deploying structures in space vehicles. Thus, EP-A-0 354 837 describes an articulation applicable to the deploying of a satellite solar panel which comprises two fittings which can roll one on the other by means of two cylindrical surfaces, guidance of the rolling being guaranteed with bands whose ends are fixed to the fittings and pass, crossing over one another, between the cylindrical surfaces. The motive torque which produces the automatic deployment of the articulation and its immobilization at the end of its travel is supplied by elastic strips formed by two overlaid bands which bind both fittings.

EP-A-0 309 650 describes an impeller device for extendable and foldable limbs of a space vehicle, in which a rotary arm which supports an operational limb is made to pivot on a main housing so as to move between a rest position and a working position. A rotary shaft is also fitted into the housing and can be moved by a spring with a rotary movement which is converted into a reciprocal partial rotation of the arm through a connection which comprises a gear, a crank and a grooved joint between the shaft and the gears. Fixing units are mounted in a stationary manner with respect to the housing and each of them comprises a catch compressed by a spring for securing the arm when it reaches its rest and working positions.

EP-A-0 330 550 describes a system for adapting deployable elements, such as solar panels, to a structure, such as a space contrivance, with the help of a bar which passes through the said elements and which can be freed by means of a mechanism at the moment of deployment of said elements, after which the bar returns to its initial position.

Finally, EP-A-0 296 936 describes a mechanism, usable in a space motor, which consists of an elastic element, such as a spring or a gas tank, interposed between a motor member and a thrust member. The motive energy for operating the mechanism is supplied, for example, by a pyrotechnic charge applied to the motor member, which enjoys limited movement. Some of this energy is transmitted to the elastic element, which releases it to the thrust member. The mechanism allows perfect control of the speed and acceleration of the parts on which it acts.

SUMMARY OF THE INVENTION

Although the prior art documents which have just been mentioned cover devices which cooperate in the deploying of structures on space vehicles, none of them has tackled or, therefore, solved the problem addressed by the present invention, namely, the creation of a mechanism which can act as a speed regulator and as a mechanical motor and which can be used in a thermal vacuum, it being suitable for effecting the deployment of structures or for carrying out experiments on a satellite placed in orbit or located in any environment.

The invention solves the addressed problem by means of a mechanism of the sort specified initially which consists basically of an escapement wheel and a detent, the escapement wheel being actuated by the same device whose speed it controls and with which is coupled the shaft for connection to the structure to be deployed, either directly or indirectly through a step-up gear wheel train, and the detent carrying a flywheel connected to its shaft.

For the purpose of enabling the mechanism of the invention to be used as a motor for the direct driving of the structure to be deployed, a spring which provides the energy required for deployment of the said structure, is connected to the escapement wheel of the said mechanism.

Given that the mechanism of the invention has been designed to work in a thermal vacuum, the material used in its construction shall have to be such as to make it compatible with the thermal vacuum between $\pm 100°$ C or more, while scarcely being impaired with respect to the performance obtained under ambient conditions. As examples of materials suitable for the construction of the mechanism of the invention the following may be mentioned: alloys of titanium, alloys of aluminium, Vespel and $MoS_2$.

BRIEF DESCRIPTION OF THE DRAWINGS

The invention will be described below in greater detail while referring to an example of the execution thereof represented in the appended drawings, in which.

DETAILED DESCRIPTION OF THE INVENTION

Figure 1:
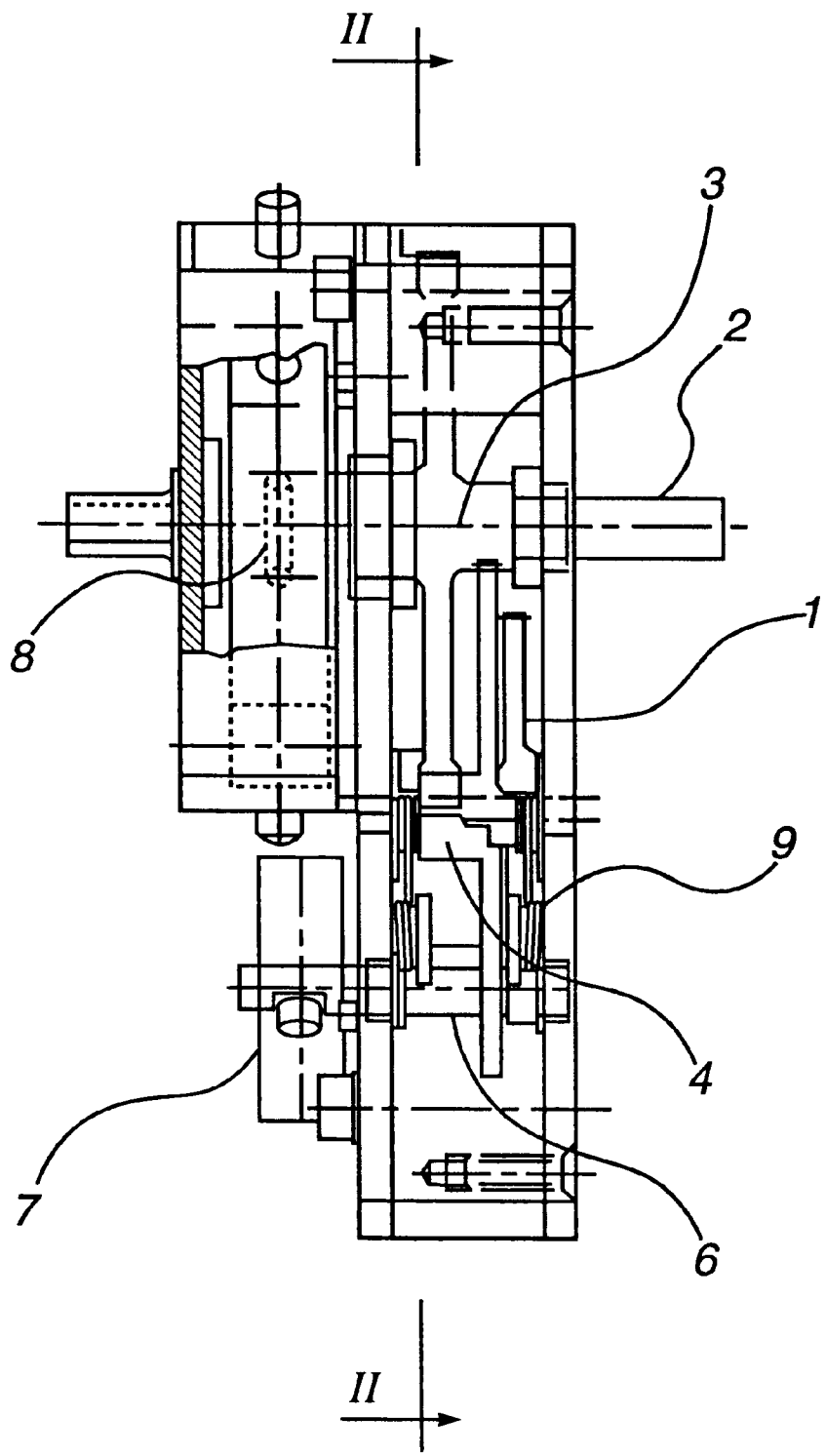
FIG. 1 is a general view of the mechanism of the invention.
Figure 2:
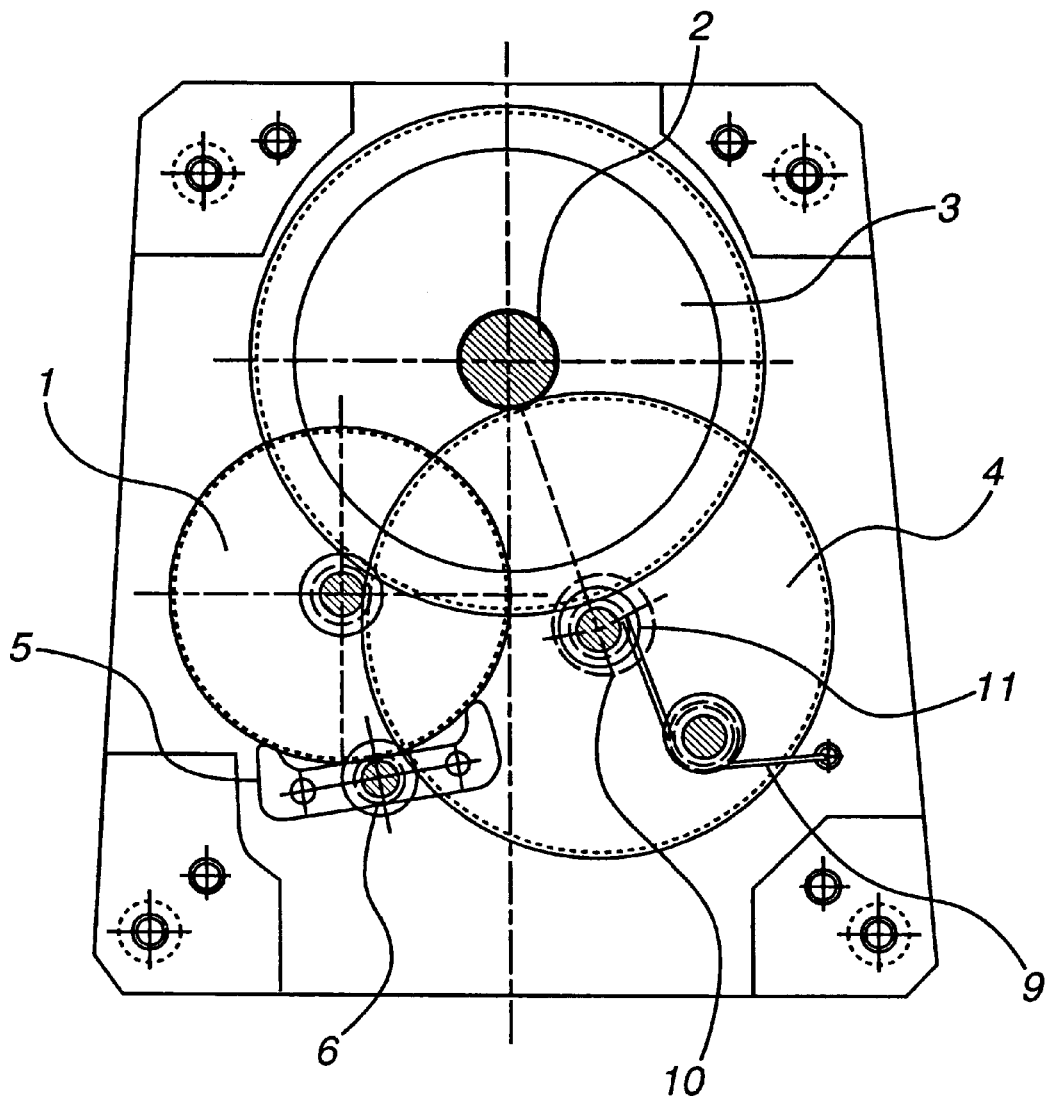
FIG. 2 is a section taken through the line A—A of FIG. 1.

As emerges from the drawings, the mechanism of the invention comprises an escapement wheel 1 coupled to the shaft 2 for connection to the structure to be deployed (not illustrated), either directly or indirectly through a step-up toothed wheel train 3 and 4. The escapement wheel 1 cooperates with a detent 5 which in turn has a flywheel 7 linked to its shaft 6.

So that the mechanism of the invention can be used as a motor for the direct driving of the structure to be deployed, a spring 8, designed to provide the energy required for the deployment, is connected to the escapement wheel 1. When the said mechanism acts as a speed regulator, the escapement wheel is actuated by the same device as it regulates and to which it is connected by the shaft 2.

The geometry and synchronization of the two basic elements of the mechanism of the invention, i.e. the escapement wheel 1 and the detent 5, mean that the detent 5 alternately frees and catches the escapement wheel 1 continually, thus preventing the complete freeing of the escapement wheel 1 and enabling the torque required for deployment to act on the said wheel, the latter transmitting it to the structure to be deployed and thereby ensuring that the latter is deployed in an uninterrupted manner, if the said mechanism acts as a motor. If the mechanism acts as a regulator, the deployment torque is provided thereto by the device whose speed is regulated through the escapement wheel and to which the latter is connected by the drive shaft 2.

Because the flywheel 7 is joined to the shaft 6 of the detent 5, the impulses which the detent receives from the escapement wheel 1 are converted into momentum of the flywheel 7, the latter changing direction with each half-period of the detent 5 and thus preventing the energy from building up.

The step-up toothed wheel train 3 and 4 connected to the escapement wheel 1 and detent 5 system enables the mechanism of the invention to adapt itself so as to transmit any torque (or force) at any required speed of deployment. Preferably, the torque to be transmitted will vary between 0.5 and 10 Nm and the speed of deployment will be from 0.01 to 1 rpm.

As stated earlier, the mechanism of the invention is designed to work in a thermal vacuum, and for this purpose the material used in its construction shall be such as to make it compatible with the thermal vacuum between $\pm 100°$ C or more, with the mechanism scarcely being impaired with respect to the performance achieved under ambient conditions. Among the different materials which may be employed to construct the mechanism of the invention, the following are preferred: alloys of titanium, alloys of aluminium, Vespel and $MoS_2$.

With the intention of facilitating reverse running whether the mechanism of the invention be a motor or merely a speed regulator, the shaft of the toothed wheel (4) incorporates a clutch 10 for disconnecting the escapement wheel and the detent. The bearings of the shaft carry grooves 11 which enable the escapement wheel and the detent to disengage when the wheel (4) moves in the opposite direction, caused by reverse running and by virtue of the grooves 11. In the working position the shaft of the wheel (4) bears on the casing and is held in this position by two torsion springs (9) which ensure correct operation thereof.

The experiments carried out with the mechanism constructed in accordance with the invention have demonstrated that it allows progressive and gradual deployment of the structure mounted on the satellite, without producing inappropriate accelerations and final speeds of opening of the said structure and without, therefore, the latter being subjected to the action of high shock loads. As a result, the structure has been able to be deployed until reaching its working position without experiencing any sort of impairment caused by uncontrolled deployment.

Although the foregoing described what is currently regarded as the preferred embodiment of the invention, those skilled in the art will understand that it will be possible to introduce modifications of detail thereto, without however departing from the spirit and scope of the invention. Therefore, the latter is deemed to be limited solely by the content of the appended claims.

I claim:

1. A combination speed regulator and mechanical motor mechanism for controlling the rotational motion of a structure comprising:

a drive shaft; an escapement wheel rotationally mounted on a first shaft;

a detent cooperating with said escapement wheel to alternately free and catch said escauement wheel continually, said detent rotating around a second shaft;

a flywheel, connected to said second shaft, such that pulses received by said detent from said escapement wheel are converted into momentum of said flywheel, said flywheel changing its direction of rotation with each half-period of motion of said detent;

a spring, connected to said drive shaft, said spring being capable of imparting a rotational fr motion to said drive shaft;

a step-up gear wheel train comprising a first gear wheel and a second gear wheel wherein said first gear wheel is coaxially mounted on said drive shaft such that said first gear wheel rotates with said drive shaft and wherein said second gear wheel is mounted on a third shaft, and wherein said second gear wheel meshes with said first gear wheel and said escapement wheel to transmit said rotational motion of said drive shaft to said escapement wheel; and a clutch for disengaging said second wheel from said escapement wheel, such that said drive shaft may be rotated in a reverse direction without causing said escapement wheel to rotate.

* * * * *

UNITED STATES PATENT AND TRADEMARK OFFICE
CERTIFICATE OF CORRECTION

PATENT NO. : 5,931,045  
DATED : August 3, 1999  
INVENTOR(S) : Angel Nuñez Valladares Page 1 of 1

It is certified that error appears in the above-identified patent and that said Letters Patent is hereby corrected as shown below:

Title page,
Item [75] Inventor, should read as -- Angel Nuñez Valladares --.

Signed and Sealed this

Nineteenth Day of February, 2002

Attest:

Attesting Officer

JAMES E. ROGAN
Director of the United States Patent and Trademark Office